Aug. 21, 1923.

J. E. WARD 1,465,537

LOCKER FOR MILK BOTTLES

Filed June 2, 1922

Inventor
John E. Ward,
By Shums Ackerman
Attorney

Patented Aug. 21, 1923.

1,465,537

UNITED STATES PATENT OFFICE.

JOHN E. WARD, OF NASHUA, NEW HAMPSHIRE.

LOCKER FOR MILK BOTTLES.

Application filed June 2, 1922. Serial No. 565,338.

*To all whom it may concern:*

Be it known that I, JOHN E. WARD, a subject of the King of Great Britain, and resident of Nashua, in the county of Hillsborough and State of New Hampshire, have invented certain new and useful Improvements in Lockers for Milk Bottles, of which the following is a specification.

This invention relates to traps or locks for milk bottles, and has for its object the provision of novel means whereby a milk bottle may be set at a customer's door and so enclosed as to prevent theft, the said invention being automatically operated to lock the closure when the bottle is applied thereto.

A further object of this invention is to produce a bottle trap of the character indicated, accessible through a locked door at the side of the trap in order that the bottle may be removed when the door is opened, and the trap may be re-set for a repetition of the operation.

It is a further object of this invention to produce a milk bottle trap of the character indicated in which the parts are resiliently retained in unlocked positions and which automatically assume their closed and locked positions upon the deposit of the bottle and the removal of the hand of the depositor from the trap.

It is a further object of the invention to provide a device of the character indicated which will be efficient and satisfactory in use as well as comparatively inexpensive to manufacture.

With the foregoing and other objects in view, the invention consists in the details of construction and in the arrangement and combination of parts to be hereinafter more fully set forth and claimed.

In describing the invention in detail, reference will be had to the accompanying drawings forming part of this application wherein like characters denote corresponding parts in the several views, and in which—

In carrying the invention into practice and as illustrated by the present embodiment of the invention, the trap includes a casing or housing 5 which is substantially rectangular in plan. The side of the casing near one end is provided with a door 5ª which may be provided with any appropriate securing devices, such as locks or the like, to insure against its being opened by one without the proper lock operating keys or the like and access may be had, to milk which has been deposited in the other end of the casing, through the said door.

Figure 1:
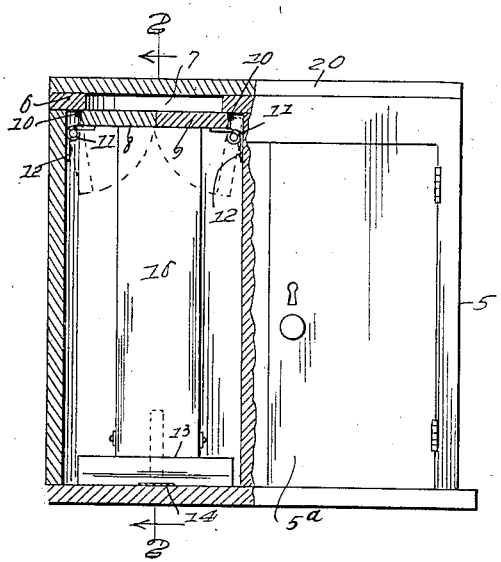
Figure 1 illustrates a view in elevation of a milk bottle trap or guard embodying the invention, the same being partly in section.

The casing is provided with a horizontally disposed closure 6 having an aperture 7 through which the milk bottle may be deposited, and the opening 7 is guarded by two oppositely hinged guards 8 and 9 which swing downwardly and outwardly toward the sides of the compartment in which the milk bottle is deposited. Appropriate hinges such as 10 may be provided for the guards. Each of the spring members 11 has a coiled central portion with extensions on each side thereof, and one of the extensions 12 is anchored to the side of the casing or receptacle in which the bottle is deposited, whereas the other arm of the spring engages the inner surface of the guard and serves to hold it normally in the position shown in Fig. 1, permitting it to swing to the dotted line position so illustrated, in which latter position a clearance is formed for the admission of the bottle of milk which is to be deposited in the receptacle. It is to be understood that these springs are duplicated for the two guards and therefore, a description of the means for holding one of the guards in normal position and for returning it to said normal position will suffice as a disclosure of that part of the invention.

Figure 2:
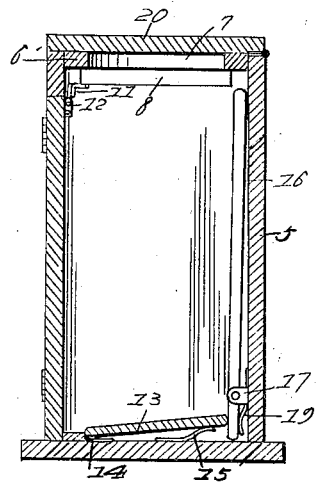
Figure 2 illustrates a sectional view thereof on a line corresponding with the line 2—2 of Fig. 1.
Figure 3:
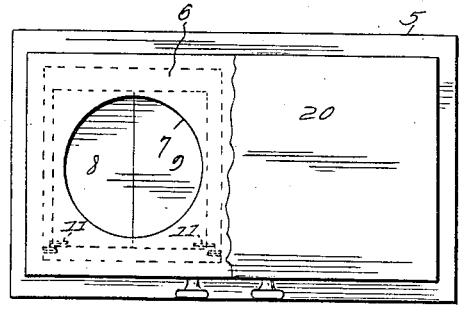
Figure 3 illustrates a top plan view with the cover removed.
Figure 4:
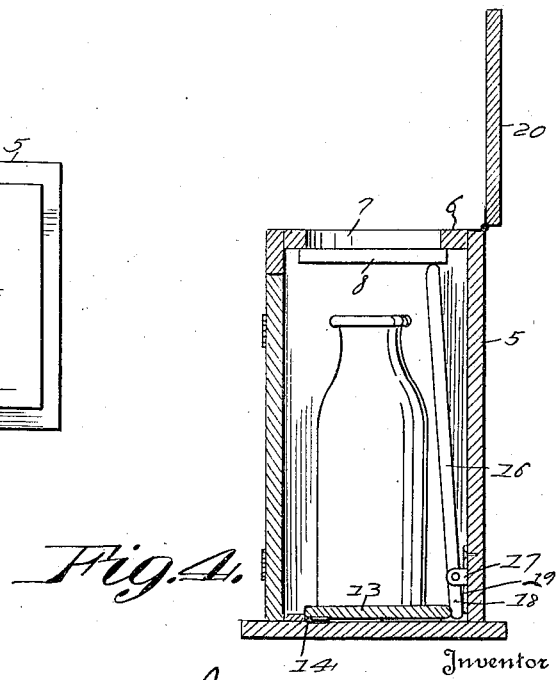
Figure 4 illustrates a sectional view through the trap when the parts are in locked positions.

At the bottom of the compartment in which the milk bottle is to be deposited, a swinging platform 13 is arranged, the said platform being mounted on a hinge 14 and having a spring 15 underlying it which acts to normally elevate the free end of the platform to the position shown in Fig. 2, but the spring is of a strength which will support the platform but will not support the platform when the weight of the milk is on it, it being the intention that the weight of the milk bottle and its contents shall serve to press the platform to the position in which it appears in Fig. 4. The oscillation of this platform is relied upon to swing a latch 16 under and into engagement with the guards and act as a prop to prevent the inward or downward swinging movement of the said guards, thus making it impossible for a person to gain access through the guards so long as the latch is in place. As shown in the drawing, the latch is pivotally mounted on a bracket 17 and that portion 18 of the latch below the pivot is engaged by the edge of the platform which serves to press the end 18 of the latch outwardly against the action of the spring 19 when the bottle and its contents is deposited. By opening the door 6, the milk bottle may be removed and thereafter the platform will be elevated under the influence of the spring and the latch will be returned to normal position under the influence of the spring 19 so that the guards will then be free to be moved downwardly again when a bottle is to be inserted.

In the interest of producing a finished structure, the casing is provided with a lid 20 hinged to cover the top, but except for the purpose of producing a finish and protecting the interior from access by water, it does not contribute materially to the successful operation of the device.

I claim:

In a locker for milk bottles, a casing, an apertured cover therefor, a platform hinged near the bottom of the casing and adapted to be moved downwardly by the weight of a bottle, means for returning the platform to normal position, guards hinged in the casing and having their inner edges in proximity, the said inner edges being adapted to swing downwardly in the casing, a bracket secured at the side of the casing on which the latch is oscillatably mounted in operative relation to the guards whereby the edges of the guards hold the upper end of the latch against inward movement when the said guards are displaced downwardly, the said guard below the pivot being engaged by the platform and moved thereby when weight is applied to the platform for swinging the latch under the guards when the guards are in normal position, and a door in the casing through which the contents of the casing may be removed.

JOHN E. WARD.